J. F. Thomas,
Hay Fork.
No. 92,762.    Patented July 20, 1869.
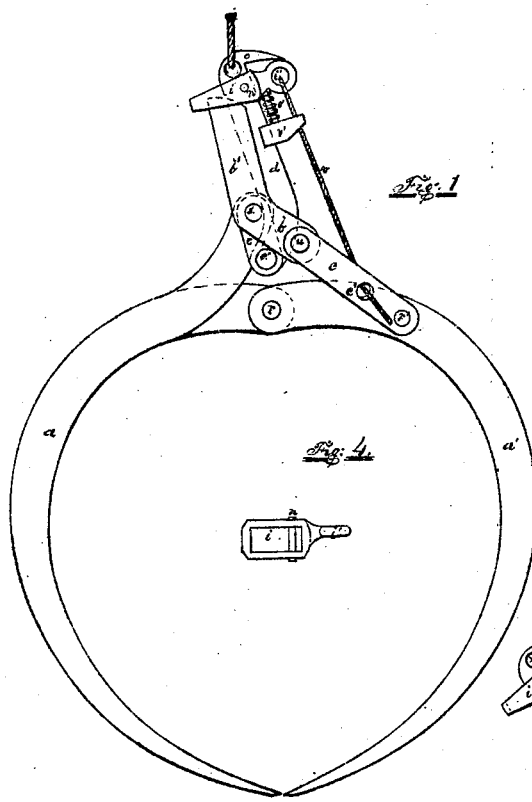
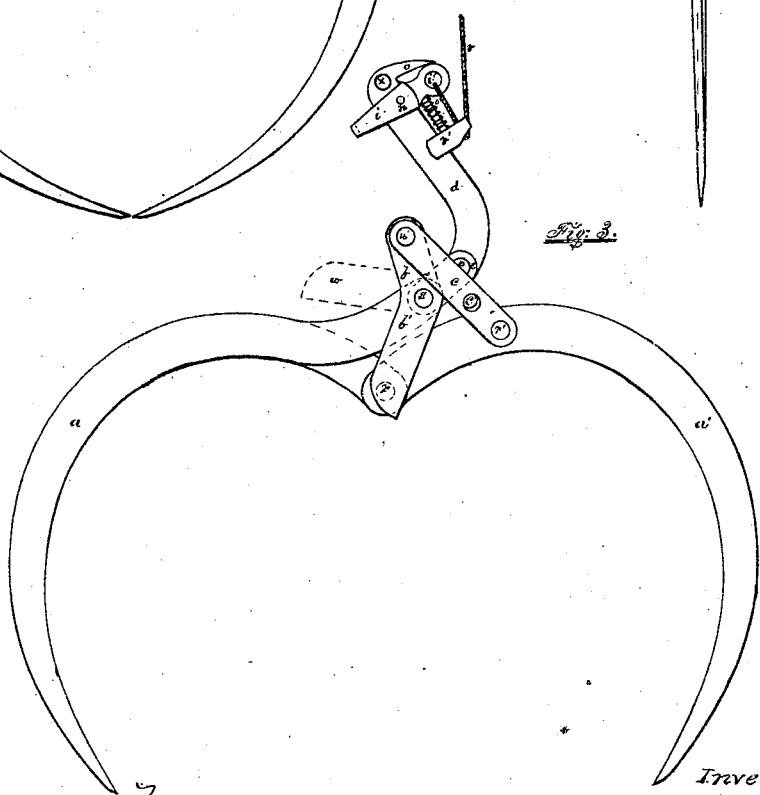
Witness.
W. C. Elliot
J. C. Shepard
Inventor.
John F. Thomas

United States Patent Office.

JOHN F. THOMAS, OF ILION, NEW YORK.

Letters Patent No. 92,762, dated July 20, 1869.

IMPROVEMENT IN HORSE HAY-FORKS.

The Schedule referred to in these Letters Patent and making part of the same.

*To all whom it may concern:*

Be it known that I, JOHN F. THOMAS, of Ilion, Herkimer county, New York, have invented a new and improved Hay-Fork; and I do hereby declare that the following is a full and exact description thereof, reference being had to the accompanying drawings, and to the letters of reference marked thereon.

Similar letters of reference indicate the same devices in all the figures.

To enable others skilled in the arts to comprehend, make, and use my invention, I will proceed to describe its nature, construction, and operation.

The nature of my invention consists in so proportioning and arranging the links of a single toggle-joint, which operates to close and open the tines of a hay-fork, that when the fork is closed upon the hay, the toggle-joint shall be in a position to hold the tines together, without locking the trip, and when the tines are opened, for the purpose of releasing the hay, the toggle-joint shall be in a position to hold the tines apart, while the fork is suspended.

It also consists in so applying a tripping-bar and rope to a toggle-joint, that they shall hold the tines apart while the fork is being drawn over the hay by the tripping-rope; and It further consists in extending one of the links of the toggle-joint, so as to form a locking-lever, and in pivoting the tripping-bar in such arrangement with it that it may be locked by the trip before the tines are closed.

Figure 1 is an elevation of my fork in a closed position.

Figure 2 is an edge elevation of the same.

Figure 3 is an elevation of my fork in an open position.

Figure 4 is a plan of the trip.

$a$ and $a'$, fork-tines.

Tine $a$ is divided at its upper end into two branches, one terminating in joint $r$, and the other in joint $s$.

$b$ short link of the toggle-joint.

$b'$, the same, extended so as to form a locking-lever.

$c$, long link of the toggle-joint.

$c'$, hole for the tripping-cord, to serve as a guide, if required.

$d$, tripping-bar.

$e$, link between tripping-bar and locking-lever.

$e'$, pivot, joining the tripping-bar to the link $e$.

$i$, trip.

$i'$, ring, for attaching the tripping-rope.

$n$, pivot of the trip, attaching it to the tripping-bar.

$o$, point extending from the tripping-bar, to serve as a guard, to prevent the trip from being raised while drawing the fork over beams, or any other object that may come in contact with it.

$o'$, spring of the trip.

$r$, joint between the two tines.

$r'$, joint between tine $a'$ and the link $c$.

$s$, joint between tine $a$ and link $b$.

$t$, rope, which suspends and raises the fork.

$u$, joint between the two links of the toggle-joint.

$v$, tripping-rope.

$v'$, guides for the same.

$w$, dotted lines, showing a position of the locking-lever, in which the trip may be closed upon it.

$x$, hole in the tripping-bar, for the attachment of the suspending-rope.

My invention refers to that kind of hay-fork which is operated by horse-power, and is used principally for unloading hay, and its operation is as follows:

The forked is first opened, as shown in fig. 3, the two tines grasped near the toggle-joints, and then forced down into the hay. As this is done, the tines approach each other at their points, and the locking-lever assumes the position indicated by dotted lines $w$, when the tripping-bar, swinging upon pivot $e'$, may be bent down, and the trip thrown over the end of locking-lever $v'$.

Then, by the application of power to the rope $t$, the tripping-bar and locking-lever assume a vertical position, the tines are forced together through the hay, and all parts of the fork assume the positions shown in fig. 1.

When the hay has been drawn up to the place where it is to be deposited, it is discharged from the fork by drawing upon tripping-cord $v$, the weight of the fork and hay causing the parts to assume the position represented in fig. 4.

When the fork is closed, the two links $b$ and $c$ of the toggle-joint are almost in a right line, so that the tendency of the fork to open, by the weight of the hay, has very little effect upon the trip, yet sufficient to move the parts when the trip is raised and the locking-lever released.

When the fork is opened to full width, the links $b$ and $c$ of the toggle-joint are nearly folded upon each other, and as the tripping-bar, to which both the suspending and tripping-rope are attached, is pivoted at $e'$, force applied to either of the ropes tends to keep the parts in the same position, and so enables the man on the load of hay to draw the fork toward him, by the tripping-rope, without closing it.

Link $e$ need not necessarily be made separate from the locking-lever, as it has little or no motion independent of that device, but, to save expense, I make them in two pieces.

By dividing the upper end of tine $a$, and extending one branch to $r$ and the other to $s$, these two joints are in a position to facilitate the application of a toggle-joint, which shall hold the tines opened or closed, as before stated, by extending the two links $b$ and $c$ nearly into a right line, to hold the fork closed, and by folding the two links upon themselves, so as to bring them in line again for hold the fork open.

Having described my invention,

I desire to have secured by Letters Patent—

1. So arranging the tripping-bar in relation to the locking-lever, that the trip may be thrown over the locking-lever before the fork is closed, substantially as and for the purpose specified.

2. The combination of guard $o$ with trip $i$ and tripping-bar $d$, substantially as and for the purpose set forth.

3. The combination of the divided tine $a$, toggle-joint $b$ and $c$, tripping-bar $d$, locking-lever $b'$, and trip $i$, substantially as and for the purpose herein specified.

JOHN F. THOMAS

Witnesses:
W. H. ELLIOT,
F. O. SHEPARD.